United States Patent

[11] 3,628,070

[72] Inventors Robert Charles Heuner
Bound Brook;
Stanley Joseph Niemiec, Somerville, both of N.J.
[21] Appl. No. 30,643
[22] Filed Apr. 22, 1970
[45] Patented Dec. 14, 1971
[73] Assignee RCA Corporation

[54] VOLTAGE REFERENCE AND VOLTAGE LEVEL SENSING CIRCUIT
13 Claims, 3 Drawing Figs.

[52] U.S. Cl. .......... 307/304, 307/235, 307/251, 307/288, 307/303, 307/313, 328/172, 328/173
[51] Int. Cl. .......... H03k17/60, H03k 19/08
[50] Field of Search .......... 307/205, 235, 238, 251, 255, 264, 279, 299, 288, 303, 304, 313; 328/115, 150, 172, 173

[56] References Cited
UNITED STATES PATENTS

| | | | |
|---|---|---|---|
| 3,119,938 | 1/1964 | Metz | 307/288 X |
| 3,260,863 | 7/1966 | Burns et al. | 307/205 |
| 3,275,996 | 9/9166 | Burns | 307/255 X |
| 3,322,974 | 5/1967 | Ahrons et al. | 307/304 X |
| 3,440,444 | 4/1969 | Rapp | 307/205 X |
| 3,449,594 | 6/1969 | Gibson et al. | 307/205 X |

*Primary Examiner*—Stanley T. Krawczewicz
*Attorney*—H. Christoffersen

ABSTRACT: The sum of the threshold voltages of two transistors of different conductivity type is employed as a reference level in voltage sensing and other circuits. A first transistor connected as a diode and its current source are connected in series between a pair of terminals to which a voltage to be sensed is applied. A second transistor of different conductivity type than the first transistor is connected at its control electrode to the connection of the diode to its current source. The conduction path of the second transistor in series with its load is connected at at least one end to one of the pair of terminals.

INVENTORS
Robert C. Heuner &
Stanley J. Niemiec
BY H. Christoffersen
ATTORNEY

VOLTAGE REFERENCE AND VOLTAGE LEVEL SENSING CIRCUIT

BACKGROUND OF THE INVENTION

Many different circuits require, for proper operation, a stable and reproducible voltage reference level. Such circuits include those suitable for the sensing, detection and comparison of voltage levels and are employed in both digital and analog systems. In the design of integrated circuits, it is desirable that circuits performing these functions be manufactured at the same time, by the same process and be of the same type as the other components on the integrated circuit chip.

In complementary metal-oxide semiconductor (C—MOS) circuitry, for example, it would be advantageous to use one or more of the transistors on a chip to perform the required sensing or comparison-type function. The threshold voltage ($V_T$) of a transistor, which is the minimum gate-to-source potential ($V_{GS}$) necessary to turn the transistor "on," has a finite and relatively well defined value which could theoretically be used as a reference setting parameter. The threshold voltage lies within the range of the operating potential applied to the C—MOS circuitry rendering this parameter compatible with the operation of the other components and thus highly suitable as a reference source. Furthermore, the high-input impedance property of such a transistor makes possible an extremely compact circuit which consumes very little power.

However, measurements of the threshold voltages ($V_T$) of different transistors show that, though the $V_T$ of N-channel devices on the same chip (made at the same time under identical conditions) varies within a range of approximately 5 percent, the $V_T$ of N-channel devices from chip to chip varies by more than 100 percent and in fact is specified to be within a range of one to four volts. Similarly, while the variation in $V_T$ of P-channel transistors on the same chip is within a range of approximately 5 percent, the variation in $V_T$ of P-channel transistors from chip to chip is large enough that it is specified to be within a range of one to four volts. It is thus evident that the threshold voltage level of a single N-type or a single P-type device is unusable to provide consistent voltage detection circuits.

It is an object of this invention to provide new and improved circuits for producing a stable reference voltage level. More particularly, the circuits are compatible with and may be placed on the same chip as integrated circuits requiring such a reference voltage level for proper operation.

SUMMARY OF THE INVENTION

The present invention resides in part in the recognition that in certain environments such as in integrated circuits, while the threshold voltages of individual devices may vary widely, the sum of the threshold voltages of a device of one type plus that of a device of another type remains substantially constant and this phenomenon may be employed as the basis for stable reference level circuits. It also resides in the circuits designed to make use of this property. They include, for one possibility, first and second insulated-gate field-effect transistors of first and second conductivity type respectively, each transistor having a threshold voltage defined as the minimum gate-to-source potential which must be exceeded for the transistor to conduct. The transistors are connected gate-to-gate with their source electrodes connected to a different one of a pair of terminals to provide across said terminals a circuit having a threshold level which is the sum of the threshold voltages of the first and second transistors. This circuit may be employed to produce an output signal indicative of whether the input voltage is greater or less than the sum of the threshold voltages.

BRIEF DESCRIPTION OF THE DRAWINGS

In the accompanying drawings, like reference characters denote like components, and.

DETAILED DESCRIPTION

For ease of presentation, insulated-gate field-effect transistors (IGFETs) of the enhancement type are used to illustrate the invention. However, it is to be understood that other known types of transistors having a common insulator layer—e.g., depletion type IGFETs, thin film transistors (TFT), or field-effect transistors formed by the silicon on sapphire method (SOS)—may be used to practice the invention. Characteristics IGFETS pertinent to the invention and for the purpose of aiding the understanding of the circuits are presented below:

1. The transistors used have first and second electrodes, referred to as the source and drain, defining the ends of a conduction path, and a control electrode (gate) whose applied potential determines the conductivity of the conduction path. For a P-type IGFET, the source electrode is defined as that electrode of the first and second electrodes having the highest potential applied thereto. For an N-type IGFET, the source electrode is defined as that electrode of the first and second electrodes having the lowest potential applied thereto.

2. The devices used are bidirectional in the sense that when an enabling signal is applied to the control electrode, current can flow in either direction in the conduction path defined by the first and second electrodes.

3. For conduction to occur, the applied gate-to-source potential ($V_{GS}$) must be in a direction to enhance conduction and must be greater in amplitude than a minimum value which is defined as the threshold voltage ($V_T$). Thus, where the applied $V_{GS}$ is in a direction to enhance conduction but is lower in amplitude than $V_T$, the transistor remains cut off and there is substantially no current flow in the conduction channel.

Figure 1:
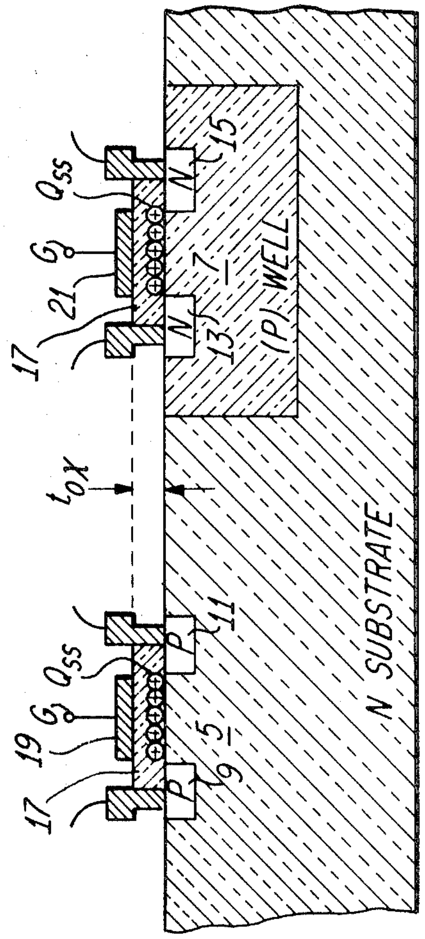
FIG. 1 is a cross-sectional view of part of an integrated circuit chip showing a P-type and an N-type IGFET with a common insulator layer.

4. The threshold voltage ($V_T$) of an IGFET is a function of surface state charge ($Q_{ss}$) and of bulk charge associated with the channel depletion region ($Q_{bnr}$). Surface state charge ($Q_{ss}$) are believed to be due to impurities in the insulator and to unsaturated ion bonds at the insulator interface. To best illustrate the effect of surface charge on threshold voltage, there is shown in FIG. 1 a cross section of a P-type transistor 5 and an N-type transistor 7 on a chip.

P-regions 9 and 11 of transistor 5 are the source and drain regions of the transistor and define the ends of its conduction path or channel. Similarly, N-regions 13 and 15 are the source and drain regions of transistor 7 and define the ends of its conduction path or channel. Gate electrodes 19 and 21, overlying the channel of transistors 5 and 7, respectively, are separated from their channel by an insulating layer 17 which, for example, may be silicon dioxide. The insulating layer in the embodiment is silicon dioxide but other known insulators could be used as well.

The insulating layer is formed (grown and/or deposited) over the transistors at the same time and its chemical composition and characteristics are substantially the same for both devices. Thus, unless special steps are taken, the thickness of the insulating silicon dioxide layer ($t_{ox}$) and the dielectric constant of the silicon dioxide layer ($\epsilon_{ox}$) are assumed to be substantially the same for all devices on a chip.

An analysis of the threshold voltage measurements, alluded to above, shows that whereas the threshold voltages of individual devices vary considerably from chip to chip, the sum of the threshold voltages of a P-type device and an N-type device on one chip is approximately equal to the sum of the threshold voltages of a P-type and an N-type device from another chip. These results are reproducible where the devices are made under similar conditions and with similar insulating layer thicknesses and material. This discovery is supported by an examination of some of the parameters which determine the threshold voltage.

It has been observed that normally the surface charge present or trapped in the insulating layer is positive in nature. This is shown in FIG. 1 by + symbols enclosed in circles over the channel regions. Where $Q_{ss}$, as shown in FIG. 1, is comprised of positive charges it generates a positive potential which is in a direction to turn "on" N-channel transistor 7 and to turn "off" P-channel transistor 5. Since the threshold voltage is the gate potential necessary to turn the transistor "on," that part of the threshold voltage due to the surface state charge tends to increase the threshold voltage of a P-channel transistor and to decrease by substantially the same amount the threshold voltage of an N-channel transistor.

The threshold voltage ($V_T$) of an N-channel transistor ($V_{TN}$) and the $V_T$ of a P-channel device ($V_{TP}$) may be expressed, (neglecting the effect of contact potential which is a different constant for each device type), respectively, as follows:

$$V_{TN}=\frac{Q_{inv_N}-Q_{ss}}{C}=V_{inv_N}-V_{ss} \qquad (1)$$

$$V_{TP}=\frac{Q_{inv_P}+Q_{ss}}{C}=V_{inv_P}+V_{ss} \qquad (2)$$

where: $Q_{ss}$ is the effective surface state charge density per unit area; $Q_{inv_N}$ and $Q_{inv_P}$ is the bulk charge per unit area associated, respectively, with the channel depletion region of the N-type and the P-type transistor; and, C which is equal to $\epsilon_{ox}/t_{ox}$ is the capacitance of the gate to the channel per unit area.

The total threshold voltage is thus the algebraic sum of the intrinsic threshold voltage necessary to invert the channel [$V_{inc}=Q_{inc}/C$] and that due to the surface state charge [$V_{ss}=Q_{ss}/C$].

It is important to note that if equations (1) and (2) for $V_{TN}$ and $V_{TP}$ are added algebraically, the sum of the two threshold voltages yield an equation from which the effect of $Q_{ss}$ is eliminated [$V_{TN}+V_{TP}=V_{inv_N}+V_{inv_P}$]. Since $Q_{ss}$ is due in great part to contaminants and surface conditions which are difficult to detect and control, but which have a great effect on the variations of the threshold level, its elimination enables a reproducible reference level to be achieved. The sum of the threshold voltages of a P-type and an N-type device are therefore used in the circuits shown in FIGS. 2 and 3 to obtain a stable reference level and to produce a novel level sensing and detection network.

Figure 2:
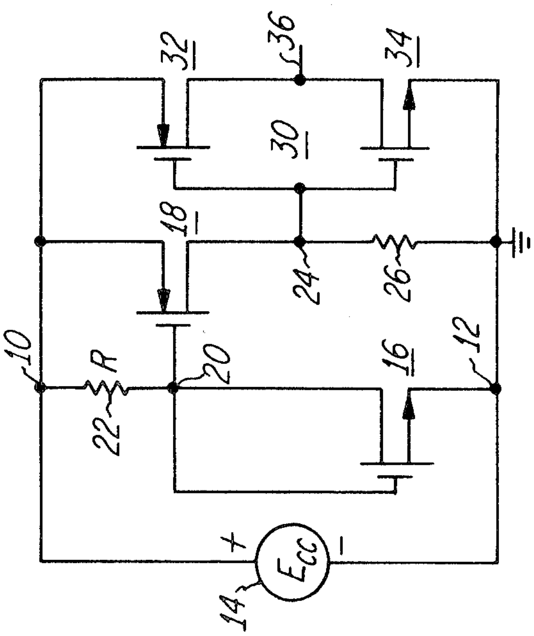
FIG. 2 is a schematic drawing of a voltage level sensing circuit embodying the invention.

The embodiment shown in FIG. 2 is used to sense the potential applied across terminals 10 and 12 by source of potential 14 whose amplitude, $E_{cc}$, may vary with time. The positive side of the source is connected to terminal 10 and its negative side is connected to terminal 12 shown as circuit ground. Transistor 16 is an N-channel transistor having its source electrode connected to junction point 12 and its gate and drain electrodes connected in common to junction point 20. Transistor 16 is connected (like an "MOS" diode) so that its drain-to-source potential ($V_{DS}$) equals its threshold voltage ($V_{TN}$).

Resistor 22 connected between terminals 10 and 20 provides a current path between the source, 14, and the drain-source path of transistor 16. When resistor 22 is made relatively large, it behaves like a current generator and provides a relatively constant current which minimizes the $V_T$ variations of transistor 16 as a function of drain-to-source current. Resistor 22 could be returned to a source of operating potential different from the source 14 if the amplitude of that source is sufficiently greater than the $V_{TN}$ of transistor 16 to maintain a relatively constant current level through the conduction path of the transistor.

Transistor 18 is a P-channel device having its gate electrode connected to junction point 20, its source electrode connected to junction point 10 and its drain to output point 24. The signal from the source 14 is applied to the source electrode of transistor 18 while its gate potential is maintained at the relatively constant reference potential ($V_{TN}$) dictated by the $V_{DS}$ of transistor 16. Transistor 18 conducts and current flows through resistor 26 connected between junction points 12 and 24 when the potential at the source exceeds the gate potential by more than the $V_{TP}$ of transistor 18. Transistor 18 operates in what may be called the common-gate mode, translating the input signal, $E_{cc}$, to output point 24 when the input signal exceeds the critical value of $V_{TP}+V_{TN}$.

Complementary inverter 30, comprising P-type device 32 and N-type device 34, amplifies and inverts the signal present at output point 24. Transistors 32 and 34 have their conduction paths connected serially between terminals 10 and 12, their gates connected in common to output point 24 and their drain connected in common to output terminal 36. The substrate connections (not shown) of the N-type devices are to the lowest potential and of the P-type devices are to the highest potential.

The operation of the circuit is best understood by first assuming that the source of potential 14 has an amplitude, $E_{cc}$, which initially is greater than the sum of the threshold drops of transistors 16 and 18 ($E_{cc}>V_{TN}+V_{TP}$). Under these conditions, a current flows through resistor 22 [$(E_{cc}-V_{TN})/R22$] and through the drain-source conduction path of transistor 16. The potential at junction point 20 is equal to the drain-to-source potential, $V_{DS}$, of transistor 16 which is maintained equal to the threshold voltage $V_{TN}$ of transistor 16 by virtue of the gate-to-drain connection. Thus, by connecting the gate of transistor 16 to its drain, $V_{DS}$ is made equal to $V_{TN}$.

The gate-to-source potential ($V_{GS}$) of transistor 18 is equal to the potential at its source electrode $E_{cc}$ minus the potential at its gate $V_{TN}$—[$V_{GS_{18}}=E_{cc}-V_{TN}$]. For transistor 18 to conduct, the amplitude $E_{cc}$ minus $V_{TN}$ must be equal to or greater than the threshold voltage of transistor 18 ($V_{TP}$); [$E_{cc}-V_{TN}\geq V_{TP}$]. It is thus evident that for transistor 18 to conduct $E_{cc}$ must also be equal to or greater than the sum of the threshold voltages of transistors 16 and 18 [$E_{cc}\geqq V_{TP}+V_{TN}$].

When the $V_{GS}$ of transistor 18 is greater than its $V_{TP}$, transistor 18 conducts and generates at output point 24 an output voltage which is substantially equal to the potential at terminal 10 ($E_{cc}$). With $E_{cc}$ applied to its gate and to its source, transistor 32 is cutoff (its $V_{GS}$ is less than its $V_{TP}$) and transistor 34 is turned "on" ($E_{cc}>V_{TN}$) and when "on" clamps output terminal 36 to ground. Thus, so long as $E_{cc}$ is greater than $V_{TP}+V_{TN}$, the potential at the output terminal 36 will be substantially equal to the potential at junction point 12,—ground potential in this instance.

A decrease in the amplitude $E_{cc}$ of the signal source causes the potential at terminal 10 to drop. When the potential at terminal 10 decreases to a value less than the sum of the threshold voltages of transistors 16 and 18, but greater than $V_{TP}$ or $V_{TN}$ [$V_{TP}$ or $V_{TN}$, $< E_{cc} < V_{TN}+V_{TP}$] transistor 18 cuts off. Note that transistor 16 still conducts ($E_{cc} > V_{TN}$) and that the potential at junction point 20 is maintained equal to $V_{TN}$. However, the $V_{GS}$ of transistor 18 is now less than its $V_{TP}$ which causes transistor 18 to cut off causing the voltage at output point 24 to go to zero volts. Any residual charge at output point 24 and any leakage current through transistor 18 is returned to ground by means of resistor 26.

With $E_{cc} > V_{TP}$ and output point 24 at zero volts, transistor 34 cuts off and transistor 32 is driven into conduction since the applied $V_{GS}$ of transistor 32 is now greater than its $V_{TP}$. When transistor 32 conducts, the potential at output terminal 36 is now substantially equal to the potential applied at terminal 10 ($E_{cc}$).

When $E_{cc}$ decreases to a value less than the $V_{TP}$ of transistor 32, ($E_{cc} < V_{TP}$) transistor 32 cuts off and output terminal 36 floats being coupled to terminals 10 and 12 through the relatively high "off" impedance of transistors 32 and 34.

In summary, it is clear that: (1) For values of $E_{cc} > V_{TN}+V_{TP}$ the signal at output point 24 is substantially equal to the input signal and the signal at the output terminal 36 of the inverter is low. (2) For values of $V_{TN}$ or $V_{TP} < E_{cc} < V_{TN}+V_{TP}$ the signal at output point 24 is substantially equal to zero volts and the signal at the output terminal 36 of the inverter is equal to $E_{cc}$.

(3*a*) For values of $V_{TN} < E_{cc} < V_{TP}$ where $V_{TP} > V_{TN}$ the signal at output point 24 is substantially equal to zero and the signal at the output 36 of the inverter is floating; (3*b*) For values of $V_{TP} < E_{cc} < V_{TN}$ where $V_{TN} > V_{TP}$ the signal at output point 24 is substantially equal to zero but the signal at output terminal 36 remains substantially equal to $E_{cc}$ until $E_{cc}$ equals $V_{TP}$ at which point the output floats.

A notable feature of the circuit embodying the invention is that in comparison to a number of other commonly employed means for producing stable reference potentials, such as zener diodes, the present network is voltage compatible with the remainder of the circuitry of the chip on which it is found. For example, a five-volt zener is useless in a circuit whose operating potential is also five volts because a higher operating potential than the reference level of the zener diode is required for its proper operation. In contrast thereto, the present invention is properly operated when the applied potential is equal to its reference level. In addition, the transistors (16 and 18) form the reference level network which may be identical to the other devices in the circuit.

Also, for reliable operation of complementary circuitry the power supply voltage should equal the sum of the threshold voltages of the two devices. Thus the circuit of FIG. 1 gives a fault indication prior to actual failure of the circuit, since absolute failure occurs only when $E_{cc}$ is equal to or lower than $V_{TN}$ or $V_{TP}$.

It has thus been shown that two transistors of different conductivity, each having a threshold voltage which may vary over a wide range may be interconnected to provide a relatively stable and reproducible reference level. An important conclusion to be derived from the above is that having recognized that $V_{TP}+V_{TN}$ of two transistors on one chip is approximately equal to $V_{TN}+V_{TP}$ on another chip, any two transistors of different conductivity may be randomly selected from any integrated circuit chip and connected as taught to provide a known reference level.

Figure 3:
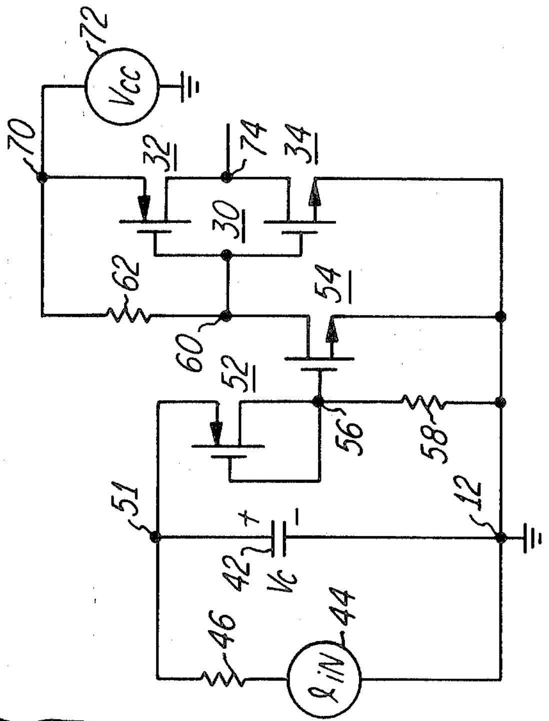
FIG. 3 is a schematic drawing of another sensing circuit embodying the invention.

In the embodiment shown in FIG. 3 the circuit senses the potential applied to capacitor 42 by a signal source 44. Resistor 46 is connected at one terminal to one side of the signal source and at its other terminal 51 to one terminal of capacitor 42. The other terminal of capacitor 42 and of signal source 44 are connected in common to terminal 12 which is shown as ground or reference potential. P-type transistor 52 has its source electrode connected to junction point 51 and its gate and drain electrodes connected in common to the gate of transistor 54 and to one end of resistor 58 at junction point 56. The other terminal of ground return resistor 58 and the source electrode of transistor 54 are connected to terminal 12. The drain electrode of transistor 54 is connected to one end of load resistor 62 and to the input of complementary inverter 30 at output point 60. The other terminal of resistor 62 is connected to terminal 70 to which is applied a source of operating potential 72 of amplitude $V_{cc}$. The substrate connection (not shown) of the N-type devices are to the lowest potential and of the P-type devices are to the highest potential.

Complementary inverter 30 similar to the one in FIG. 2 and comprising P-type transistor 32 and N-type transistor 34 generates at output terminal 74 an inverted and amplified version of the level detector output signal present at output point 60. The source of transistor 32 is connected to terminal 70 and its drain is connected in common with the drain of transistor 34 to output terminal 74. The gates of transistors 32 and 34 are connected in common to output point 60 and the source of transistor 34 is returned to terminal 12.

The threshold voltages of P-type transistor 52 ($V_{TP}$) and N-type transistor 54 ($V_{TN}$) are summed between junction point 51 and terminal 12. Signal source 44 charges capacitor 42 generating a potential ($V_c$) across it.

If $V_c$ is greater than the sum of $V_{TN}+V_{TP}$ of transistors 52 and 54, both transistors conduct and output point 60 is effectively clamped to ground by the drain-source path of transistor 54. This causes transistor 32 of complementary inverter 30 to also conduct (assuming $V_{cc}$ to be greater than $V_{TP}$) clamping the potential at output terminal 74 to $V_{cc}$. The gate-to-source potential ($V_{GS}$) of transistor 54 is equal to the potential at junction point 56 which is equal to the potential across capacitor 42 ($V_c$) minus the source-to-drain voltage ($V_{DS}$) of transistor 52. The $V_{DS}$ of transistor 52 is, due to the gate-to-drain connection, equal to the $V_{TP}$ of transistor 52 [$V_{GS}$ of transistor 54= $V_c - V_{TP}$ ].

So long as the $V_{GS}$ of transistor 54 is equal to or greater than its $V_{TN}$ transistor 54 conducts causing output terminal 74 to be clamped to $V_{cc}$. When the input signal decreases causing $V_c$ to be less than the sum of $V_{TN}+V_{TP}$ the voltage at junction point 56 ($V_{GS}$ of transistor 54) which is equal to $V_c$ minus the $V_{TP}$ of transistor 52 [$V_c - V_{TP}$] becomes less than the $V_{TN}$ of transistor 54, [$V_c - V_{TP} < V_{TN}$ transistor 54]. At this point transistor 54 cuts off and output point 60 goes positive rising towards $V_{cc}$ by means of resistor 62. This turns transistor 34 "on" assuming ($V_{cc} > V_{TN}$) and the voltage at output terminal 74 is clamped to ground.

In this embodiment, the input signal is applied to the source electrode of transistor 52 and translated to the gate of transistor 54 minus the threshold voltage drop of transistor 52 ($V_{TP}$). Transistor 54 is operated in the common-source mode and conducts as a function of whether the potential applied to its gate is equal to or greater than its threshold voltage. It is clear that for transistor 54 to conduct, the signal, $V_c$, must exceed the sum of $V_{TP}+V_{TN}$. The sum of the threshold voltages of two transistors of different conductivity are thus used to establish a reference level.

By summing the threshold voltages the effect of surface states on the threshold voltages has been eliminated. The combination of two transistors of different conductivity type is thus useful as a reference voltage setting circuit which can provide an output signal at an output electrode independent of the two terminals across which the reference signal is established.

What is claimed is:

1. A voltage level sensing circuit comprising in combination:
   first and second junction points for applying therebetween a source of potential whose amplitude is to be sensed;
   first and second insulated-gate field-effect transistors of first and second conductivity type, respectively; each transistor having a drain, a source and a gate electrode, and each transistor having a threshold voltage defined as the minimum gate-to-source potential that must be applied to initiate conduction in the drain-source path;
   an output point for producing thereat a signal indicative of whether the amplitude of said source potential is greater or less than the sum of the threshold voltages of said first and second transistors;
   means connecting the gate and drain of said first transistor together and to the gate of said second transistor;
   means connecting the source of said first transistor to one of said first and second junction points for generating a potential drop equal to the threshold voltage of said first transistor between said one junction point and the gate electrode of said second transistor; and
   means connecting the source of said second transistor to the other one of said junction points and the drain of said second transistor to said output point.

2. The combination as claimed in claim 1 further including current generating means connected to the drain and gate of said first transistor for providing a current path for the drain-source path of said first transistor.

3. The combination as claimed in claim 2 wherein said current generating means is a resistor connected between said first transistor and the other one of said junction points.

4. The combination as claimed in claim 3 further including a complementary inverter comprising third and fourth transistors of first and second conductivity type, respectively, each transistor having a gate, a drain and a source electrode;
   means connecting the gate electrodes of said third and fourth transistors in common to said output point;

an output terminal for producing an output signal which is an inverted and amplified version of the signal at said output point;

means connecting the drain electrodes of said two transistors in common and to said output terminal; and means for connecting the source electrodes of said complementary transistors to opposite terminals of a source of operating potential.

5. The combination as claimed in claim 3 wherein said source of potential has an amplitude which varies with time; and wherein the potential applied between the gate and source electrodes of said second transistor is equal to the value of the input signal minus the threshold voltage drop of said first transistor.

6. The combination as claimed in claim 3 wherein said transistors are insulated-gate field-effect transistors of the enhancement type.

7. The combination comprising:

first and second transistors, each having a source region and a drain region spaced apart to form a channel; the regions of said first transistor being of first conductivity type and the regions of said second transistors being of second conductivity type, each transistor having a gate electrode separated from said channel by an insulating layer formed in common on both transistors; each transistor being characterized by a threshold voltage defined as the minimum gate-to-source potential that must be applied for conduction in the drain-source path; said threshold voltage depending in part on surface charges in the insulating layer wherein the threshold voltage of one of said transistors is increased by said surface charge and the threshold voltage of the other transistor is decreased a like amount by said surface charge;

first and second junction points;

means for applying a source of potential between said junction points;

means connecting the gate and drain of one of said two transistors in common and to the gate of the other one of said two transistors;

means connecting the source electrodes of said first and second transistors to a different one of said junction points for summing their threshold voltages therebetween and effectively cancelling the effect of surface charge in the insulating layer; and output load means connected to the drain region of the other one of said transistors for producing an output signal as a function of the amplitude of the source of potential being greater than or less than the sum of the threshold voltages of said first and second transistors.

8. In an integrated circuit comprised of insulated-gate field-effect transistors of first and second conductivity type; each transistor being characterized by a threshold voltage which is dependent in part on surface charges which increase the threshold voltage of one type of transistor by a given amount and decrease the threshold voltage of the other type of transistors by substantially the same amount, an improved voltage reference circuit comprising:

first and second junction points;

two transistors, one of said first conductivity type and the other one of said second conductivity type, each transistor having a gate, a drain and a source electrode;

means connecting the gate and drain of one of said two transistors together and to the gate of the other transistor; and means connecting the source of said one transistor to said first junction point and the source of the other one of said two transistors to said second junction point for summing the threshold voltages of the two transistors between said two junction points and producing therebetween a source of reference potential.

9. In integrated circuits which include transistors of two conductivity types and in which the sum of the threshold voltages of two transistors of first and second conductivity type on one integrated circuit is substantially equal to the sum of the threshold voltages of two transistors of first and second conductivity type on another integrated circuit made in the same manner and by the same process, a stable voltage reference circuit comprising, in combination:

a pair of terminals across which a voltage is to be applied;

a series circuit connected between said terminals comprising a transistor of said one conductivity type connected to operate as a diode, connected in series with an impedance; and a second circuit comprising a transistor of said second conductivity type having a control electrode and a conduction path whose conductivity is controlled by the potential applied to said control electrode, and a load in series with said conduction path, said control electrode being connected to an intermediate point along said series circuit, and said conduction path being connected, at the end thereof not connected to said load, to one of said pair of terminals.

10. In a circuit as set forth in claim 9, both of said transistors being field-effect transistors having a conduction path and a control electrode and said transistor connected as a diode including a direct connection between its control electrode and one end of its conduction path.

11. In a circuit as set forth in claim 9, said impedance and said load comprising resistors.

12. In a circuit as set forth in claim 9, the circuit comprising the load in series with the conduction path of the second circuit being also connected between said pair of terminals.

13. In a circuit which includes transistors of two different conductivity types and in which the sum of the threshold voltage of a transistor of one conductivity type and the threshold voltage of a transistor of second conductivity type is a reproducible and constant level, a stable voltage reference circuit comprising, in combination:

a pair of terminals across which a voltage is to be applied:

two field-effect transistors of opposite conductivity type, each having a drain electrode, a gate electrode, and a source electrode; said two transistors being connected together at their gate electrodes, the source electrode of one transistor being connected to one of said terminals and the source electrode of the other transistor being connected to the other of said terminals;

a direct connection between the gate electrode and drain electrode of one of said transistors; and output load means connected to the drain electrode of the other one of said two transistors for producing a current therethrough when the amplitude of the voltage applied across said pair of terminals exceeds the sum of the threshold voltages of said two transistors.

* * * * *

UNITED STATES PATENT OFFICE

CERTIFICATE OF CORRECTION

Patent No. 3,628,070 Dated December 14, 1971

Inventor(s) Robert C. Heuner and Stanley J. Niemiec

It is certified that error appears in the above-identified patent and that said Letters Patent are hereby corrected as shown below:

Column 2 line 15 After "characteristics" insert ---of---.

Column 3 line 33 Delete "$V_{inc}$" and insert therefor ---$V_{inv}$---.

Delete "$Q_{inc}$" and insert therefor ---$Q_{inv}$---.

Column 4 line 70 Delete "$V_{IN}$" and insert therefor ---$V_{TN}$---.

Signed and sealed this 22nd day of August 1972.

(SEAL)
Attest:

EDWARD M.FLETCHER,JR.
Attesting Officer

ROBERT GOTTSCHALK
Commissioner of Patents